United States Patent
Mohindra

(10) Patent No.: US 10,031,618 B2
(45) Date of Patent: Jul. 24, 2018

(54) IDENTIFYING HOVER AND/OR PALM INPUT AND REJECTING SPURIOUS INPUT FOR A TOUCH PANEL

(71) Applicant: QUALCOMM Incorporated, San Diego, CA (US)

(72) Inventor: Rishi Mohindra, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 14/796,968

(22) Filed: Jul. 10, 2015

(65) Prior Publication Data

US 2016/0188110 A1    Jun. 30, 2016

Related U.S. Application Data

(63) Continuation of application No. 13/479,459, filed on May 24, 2012, now Pat. No. 9,081,450.

(60) Provisional application No. 61/495,161, filed on Jun. 9, 2011.

(51) Int. Cl.
   *G06F 3/045*    (2006.01)
   *G06F 3/041*    (2006.01)
   *G06F 3/044*    (2006.01)
   *G06F 3/0488*   (2013.01)

(52) U.S. Cl.
   CPC ............ *G06F 3/0418* (2013.01); *G06F 3/044* (2013.01); *G06F 3/045* (2013.01); *G06F 3/0488* (2013.01); *G06F 2203/04104* (2013.01); *G06F 2203/04108* (2013.01)

(58) Field of Classification Search
   CPC ....... G06F 3/0488; G06F 3/0416; G06F 3/044
   USPC ................................................. 345/173–174
   See application file for complete search history.

(56) References Cited

U.S. PATENT DOCUMENTS

| 7,808,255 | B2 | 10/2010 | Hristov et al. |
| 7,821,274 | B2 | 10/2010 | Philipp et al. |
| 7,821,502 | B2 | 10/2010 | Hristov |
| 7,864,160 | B2 | 1/2011 | Geaghan et al. |
| 7,932,898 | B2 | 4/2011 | Philipp et al. |
| 9,081,450 | B1* | 7/2015 | Mohindra ............... G06F 3/044 |
| 2007/0229477 | A1* | 10/2007 | Ludwig .................... G10H 1/00 345/173 |
| 2008/0158185 | A1* | 7/2008 | Westerman ........... G06F 3/0488 345/173 |
| 2008/0309629 | A1* | 12/2008 | Westerman ............. G06F 3/038 345/173 |
| 2009/0095540 | A1* | 4/2009 | Zachut .................... G06F 3/044 178/18.03 |

(Continued)

*Primary Examiner* — Kwin Xie
(74) *Attorney, Agent, or Firm* — Weaver Austin Villeneuve & Sampson LLP-QUAL

(57) ABSTRACT

A touch panel controller may include a communications module configured to receive pixel values, where each pixel value represents a capacitance associated with a pixel formed at a drive electrode and a sensor electrode of a touch panel. The touch panel controller may also include a processing module configured to discard pixel values below a noise threshold, discard pixel values for non-zero pixels that are not adjacent to non-zero pixels, reject detected input for pixel values associated with a palm input, compute an initial centroid associated with the pixel values, reject detected input for pixel values associated with a hover input, and provide detected input that is not associated with palm input or hover input.

18 Claims, 5 Drawing Sheets

(56) References Cited

U.S. PATENT DOCUMENTS

| | | |
|---|---|---|
| 2009/0160784 A1* | 6/2009 | Ishida .................. G06F 1/1616 345/173 |
| 2009/0244014 A1* | 10/2009 | Hotelling .............. G06F 3/0416 345/173 |
| 2010/0044122 A1 | 2/2010 | Sleeman et al. |
| 2010/0156811 A1 | 6/2010 | Long et al. |
| 2010/0156846 A1 | 6/2010 | Long et al. |
| 2010/0258360 A1 | 10/2010 | Yilmaz |

* cited by examiner

IDENTIFYING HOVER AND/OR PALM INPUT AND REJECTING SPURIOUS INPUT FOR A TOUCH PANEL

CROSS-REFERENCE TO RELATED APPLICATIONS

The present application is a continuation of U.S. patent application Ser. No. 13/479,459, filed May 24, 2012, which claims the benefit of 35 U.S.C. § 119(e) of U.S. Provisional Application Ser. No. 61/495,161, filed Jun. 9, 2011, and titled "HOVER, PALM AND SPURIOUS REJECTION FOR MUTUAL CAPACITANCE TOUCH CONTROLLERS," both of which are hereby incorporated by reference.

BACKGROUND

A touch panel is a human machine interface (HMI) that allows an operator of an electronic device to provide input to the device using an instrument such as a finger, a stylus, and so forth. For example, the operator may use his or her finger to manipulate images on an electronic display, such as a display attached to a mobile computing device, a personal computer (PC), or a terminal connected to a network. In some cases, the operator may use two or more fingers simultaneously to provide unique commands, such as a zoom command, executed by moving two fingers away from one another; a shrink command, executed by moving two fingers toward one another; and so forth.

A touch screen is an electronic visual display that incorporates a touch panel overlying a display to detect the presence and/or location of a touch within the display area of the screen. Touch screens are common in devices such as all-in-one computers, tablet computers, satellite navigation devices, gaming devices, and smartphones. A touch screen enables an operator to interact directly with information that is displayed by the display underlying the touch panel, rather than indirectly with a pointer controlled by a mouse or touchpad. Capacitive touch panels are often used with touch screen devices. A capacitive touch panel generally includes an insulator, such as glass, coated with a transparent conductor, such as indium tin oxide (ITO). As the human body is also an electrical conductor, touching the surface of the panel results in a distortion of the panel's electrostatic field, measurable as a change in capacitance.

SUMMARY

A touch panel controller is disclosed. In one or more implementations, the touch panel controller comprises a communications module configured to receive pixel values, where each pixel value represents a capacitance associated with a pixel formed at a drive electrode and a sensor electrode of a touch panel. The touch panel controller also comprises a processing module configured to discard pixel values below a noise threshold, discard pixel values for non-zero pixels that are not adjacent to non-zero pixels, reject detected input for pixel values associated with a palm input, compute an initial centroid associated with the pixel values, reject detected input for pixel values associated with a hover input, and provide detected input that is not associated with palm input or hover input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1:
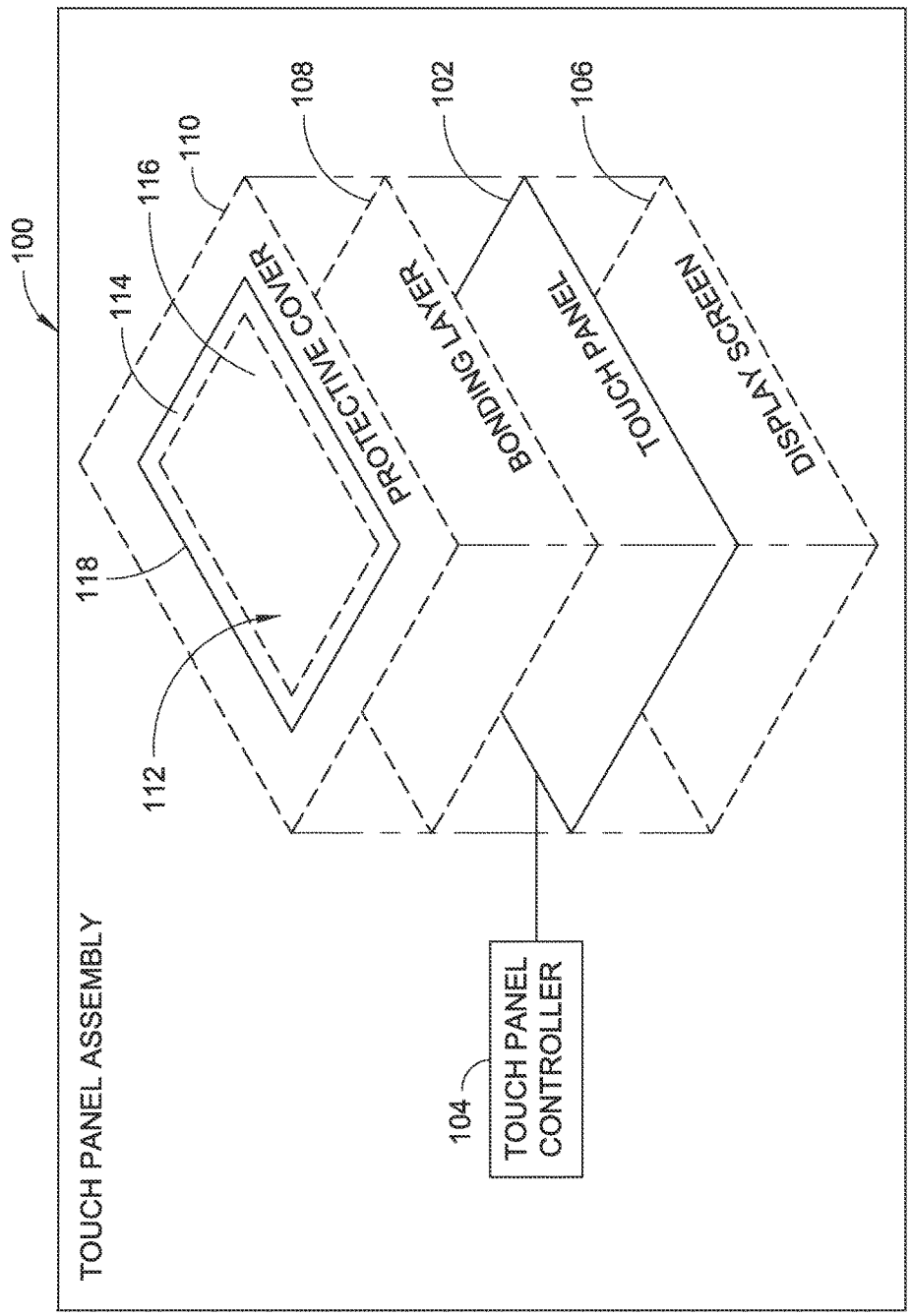
FIG. 1 is a diagrammatic illustration of a touch panel assembly including a touch panel controller configured to identify hover and/or palm input and reject spurious input to a touch panel in accordance with example implementations of the present disclosure.

Oftentimes touch panel control equipment will detect spurious or unintended signals generated when an operator positions a touch instrument, such as a finger or a stylus, over the touch surface of a touch panel while not actually touching the touch surface. This positional orientation of a touch instrument may be referred to as "hovering." In many cases, the change in distance between touching and hovering may be about one millimeter (1 mm) or less. An operator may hover with a touch instrument over a touch surface and generate unintended input for a variety of reasons. For example, an operator may idly hover over a touch surface while debating about which region of a touch panel to select (e.g., when multiple options are presented to the operator). In other instances, an operator may hover in anticipation of a selection that must be performed quickly and/or accurately (e.g., when the operator uses the touch panel as an input device for an electronic game). In these instances, which may be referred to as "static" hover, touch panel control equipment can have difficulty distinguishing a spurious input signal from an intended touch.

It is generally desirable to either reject input from a hovering condition or process hovering input differently from input received during a touching condition (e.g., depending upon the requirements of a particular application). It may also be desirable to recognize a stylus and distinguish it from a finger and/or a hovering finger. Further, finger sizes may vary greatly from person to person, and the response of a touch panel may also change from the edges of the touch panel toward the central region of the touch panel. These variations can make rejecting input received from a hover condition difficult.

Additionally, an operator of a touch panel may generate other types of spurious input. For instance, when operating a touch panel, an operator may inadvertently rest part of an appendage, such as a palm, on a portion of a touch surface. For example, when a touch panel is included with a touch screen for a portable electronic device, such as a tablet computer, an operator may rest a palm upon a peripheral region of the electronic device while executing touch operations. However, in many cases a touch screen may cover a substantial portion of the surface of an electronic device, extending close to the edge of the device. Thus, when an operator rests a palm at the periphery of such a device, a portion of the palm may be disposed on the touch screen and generate spurious touch input. Spurious finger signals may be generated by larger fingers when they couple with non-shielded connection traces of a touch panel, and may also need to be rejected. Portions of an operator's body may also generate unintended input even when the operator is not actually touching a touch surface (e.g., in the manner of static hover signals detected for a palm as described above with reference to a touch instrument).

Accordingly, the present disclosure is directed to a touch panel controller that can implement one or more rule sets configured to furnish rejection of a spurious input signal generated as the result of hover. In implementations, the touch panel controller can also reject a spurious input signal generated as the result of detecting a portion of an appendage (e.g., a palm) in contact with the touch surface of a touch panel. A rule set for rejecting hover and/or palm detection can be tailored to a specific touch panel configuration (e.g., including parameters specific to a particular touch panel size, resolution, and so forth). In implementations, the touch panel controller is configured for a capacitive touch panel, such as a mutual capacitance touch panel. The touch panel controller may be operative to implement hover rejection and/or palm rejection when used with touch instruments such as styluses having diameters between approximately two and four millimeter (2-4 mm) and/or fingers having diameters between approximately four and twenty millimeters (4-20 mm).

A touch panel controller configured in accordance with the present disclosure may be used with touch-based human interface devices including, but not necessarily limited to: large touch panel products, all-in-one computers, mobile computing devices (e.g., handheld portable computers, Personal Digital Assistants (PDAs), laptop computers, netbook computers, tablet computers, and so forth), mobile telephone devices (e.g., cellular telephones and smartphones), portable game devices, portable media players, multimedia devices, satellite navigation devices (e.g., Global Positioning System (GPS) navigation devices), e-book reader devices (eReaders), Smart Television (TV) devices, surface computing devices (e.g., table top computers), Personal Computer (PC) devices, as well as with other devices that employ touch-based human interfaces.

Example Implementations

Figure 2:
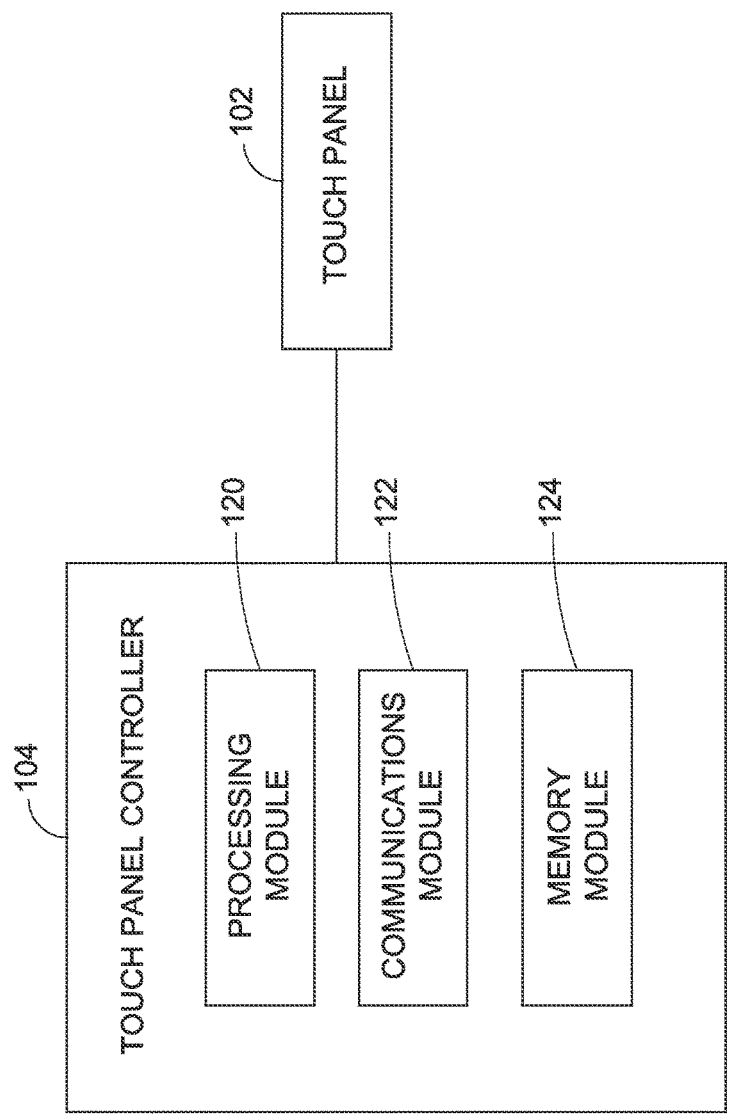
FIG. 2 is a diagrammatic illustration of a touch panel controller configured to identify hover and/or palm input and reject spurious input to a touch panel in accordance with example implementations of the present disclosure.

FIGS. 1 and 2 illustrate example touch panel assemblies 100 configured to receive and interpret input from an instrument such as a finger, a stylus, and so forth. A touch panel assembly 100 includes a touch panel 102 coupled with a touch panel controller 104 for controlling the touch panel 102. In implementations, a touch panel 102 may comprise a mutual capacitance based capacitive touch panel, such as a Projected Capacitive Touch (PCT) panel. The touch panel 102 may include cross-bar X and Y ITO patterns used for drive electrodes/traces and sensor electrodes/traces. The drive electrodes and sensor electrodes correspond to a coordinate system, where each coordinate location (pixel) comprises a capacitor formed at an intersection between a drive electrode and a sensor electrode.

The drive electrodes are connected to a current source to generate a local electrostatic field at each capacitor, and a change in the local electrostatic field generated by the touch of an instrument (e.g., a finger or a stylus) at each capacitor causes a change in capacitance at the corresponding coordinate location/pixel. In some cases, more than one touch can be sensed at differing coordinate locations simultaneously. In implementations, the pitch, or substantially repetitive spacing between adjacent longitudinal axes of the drive electrodes and sensor electrodes (e.g., ITO spacing), may be approximately five millimeters (5 mm) to provide touch accuracy for the touch of one or more fingers, and touch resolution for a touch comprising two or more fingers (e.g., when the fingers are separated by approximately ten and one-half millimeters (10.5 mm) center to center).

The cross-bar patterns can be formed using two (2) layers (e.g., a drive layer and a sensor layer) or 1.5-layers (e.g., drive and sensor electrodes on a single layer, with jumpers connecting portions of the drive and/or sensor electrodes together). The sensor electrodes are electrically insulated from the drive electrodes (e.g., using a dielectric layer, and so forth). For example, the sensor electrodes may be provided on one substrate (e.g., comprising a sensor layer disposed on a glass substrate), and the drive electrodes may be provided on a separate substrate (e.g., comprising a drive layer disposed on another substrate). In this two-layer configuration, the sensor layer can be disposed above the drive layer (e.g., with respect to a touch surface 112). For example, the sensor layer can be positioned closer to a touch surface 112 than the drive layer. However, this configuration is provided by way of example only and is not meant to be restrictive of the present disclosure. Thus, other configurations can be provided where the drive layer is positioned closer to a touch surface 112 than the sensor layer, and/or where the sensor layer and the drive layer comprise the same layer. For instance, in a 1.5-layer implementation (e.g., where the drive layer and the sensor layer are included on the same layer but physically separated from one another), one or more jumpers can be used to connect portions of a drive electrode together. Similarly, jumpers can be used to connect portions of a sensor electrode together.

One or more touch panels 102 can be included with a touch panel assembly 100 implemented as a touch screen assembly. A touch screen assembly may include a display screen 106, such as an LCD screen, where the sensor layer and the drive layer of the touch panel 102 are sandwiched between the display screen 106 and a bonding layer 108, e.g., with a protective cover 110 (e.g., glass) attached thereto. The protective cover 110 may include a protective coating, an anti-reflective coating, and so forth. The protective cover 110 may comprise a touch surface 112, upon which an operator can use a touch instrument (e.g., one or more fingers, a stylus, and so forth) to input commands to the touch screen assembly. For example, the touch panel 102 may be operatively configured to allow an operator of the touch panel 102 to use a writing accessory, such as a stylus, which includes a generally pointed end having a smaller diameter than a finger. The commands can be used to manipulate graphics displayed by, for example, the LCD screen. Further, the commands can be used as input to an electronic device connected to a touch panel 102, such as a multimedia device or another electronic device (e.g., as previously described).

Three-dimensional (3-D) calibration may be performed for a particular touch panel 102 configuration using a robot for positioning a touch instrument at various locations upon the touch surface 112 of a touch panel 102 and/or at positions above but not touching (hovering) over the touch surface 112 (e.g., using an air gap of between approximately one-half and one millimeter (0.5-1 mm) above a touch surface 112 of the touch panel 102). In other instances, an air gap may be simulated using a low dielectric constant film (e.g., a film having an e-value of approximately one and eight-tenths (1.8) and a thickness of approximately seven-tenths of a millimeter (0.7 mm)). In some instances, e.g., for a pixel pitch between approximately four and five millimeters (4-5 mm), the touch panel 102 may be divided into a seven-by-seven (7×7) mesh grid during centroid computation.

The calibration can be performed using different touch instruments, including but not necessarily limited to: a stylus, a ring-shaped touch instrument, a flat touch instrument, and so forth. The touch instruments may comprise different shapes and/or materials, and may be configured to approximate the effects of a human appendage such as a finger when contacting and/or in proximity to a touch panel 102. In implementations, various brass fingers and/or styluses can be used having diameters between approximately two and twenty millimeters (2-20 mm). For example, calibration can be performed using multiple touch instruments having different diameters, including but not necessarily limited to approximately: two millimeters (2 mm), four millimeters (4 mm), seven millimeters (7 mm), ten millimeters (10 mm), twelve millimeters (12 mm), fifteen millimeters (15 mm), and so forth.

Touch parameters that may be extracted from the calibration include, but are not necessarily limited to: mass, non-zero pixel count, peak, and aspect ratio for a particular touch panel 102 configuration. The performance of the touch panel 102 with respect to these parameters may then be measured using the data acquired during the calibration.

For the purposes of the present disclosure, the term "non-zero pixel" may be used to refer to a non-zero capacitance value associated with a coordinate location formed at the intersection of a drive electrode and a sensor electrode. For example, a pixel value (Z-value) determined for a particular coordinate location may comprise a digital value between zero and approximately one thousand five hundred (0-1500). It should be noted that the upper range for a Z-value may be based upon a processing parameter, such as a digital word length.

The touch panel 102 may be calibrated so that each capacitance value associated with a coordinate location will register at or near the upper range of possible pixel values for that location during a full touch condition. This may be implemented using different gain for each pixel, different gain for different regions of the touch panel 102 (e.g., different gain for an outer panel portion 114 versus an inner panel portion 116), and so forth.

The outer panel portion 114 of the touch panel 102 may be defined by a region of the touch surface 112 extending from an outer edge 118 of the touch surface 112 toward an inner panel portion 116 of the touch surface 112. In some instances, the outer panel portion 114 may comprise a generally rectangle-shaped strip extending around the periphery of the touch panel 102, and may have a width of approximately one-half the diameter of a typical human finger (e.g., between approximately three and one-half and five millimeters (3.5-5 mm)). However, this width is provided by way of example only and is not meant to be restrictive of the present disclosure. Thus, in other instances, the width of the outer panel portion 114 may be about the diameter of a typical human finger (e.g., between approximately five and ten millimeters (5-10 mm)).

In implementations, the gain of a full touch panel 102 may be calibrated for row drive mismatch, column sensor mismatch, and/or for panel pixel gain variation due to distributed Resistor-Capacitor (R-C) network effects of the touch panel 102 (e.g., gain and phase roll-off that may be spatially dependent). This type of gain calibration can be performed using a modified inverse matrix technique, an individual pixel calibration technique (e.g., dark frame calibration), and so forth.

Further, the Z-value associated with each coordinate location may be adjusted to account for one or more environmental factors, such as signal noise, temperature-dependent noise, and so forth. For example, a noise threshold value, which may be computed for each pixel and/or for different regions of the touch panel 102 (e.g., for an outer panel portion 114 versus an inner panel portion 116 as previously described), may be subtracted from each Z-value. This technique can be used to remove measurements below the noise threshold (e.g., discarding negative Z-values after subtracting a noise threshold value and replacing them with zero (0) values). In this manner, a remaining non-zero pixel Z-value may be indicative of the presence of a touch.

For the purposes of the present disclosure, the term "mass" may be used to refer to the sum of the non-zero pixel Z-values for a set of coordinate locations associated with a particular touch (e.g., an area associated with a finger touch (finger area)). The term "average mass" may be used to refer to the average of the sums of multiple non-zero pixel Z-values associated with multiple touches (e.g., multiple finger areas). The term "mass threshold" may be used to refer to a threshold value used to discard spurious signals detected by the touch panel 102, e.g., by discarding a touch associated with a mass below a particular mass threshold.

For the purposes of the present disclosure, the term "peak" may be used to refer to the largest single Z-value for a set of coordinate locations associated with a particular touch (e.g., a finger area). The term "peak threshold" may be used to refer to a threshold value used to discard spurious signals detected by the touch panel 102, e.g., by discarding a touch associated with a peak below a particular peak threshold.

For the purposes of the present disclosure, the term "aspect ratio" may be used to refer to a proportion representing a peak with respect to a number of non-zero pixels (non-zero pixel count) for a set of coordinate locations associated with a particular touch (e.g., a finger area). In some instances, the aspect ratio may be a peak divided by a non-zero pixel count, while in other instances, the aspect ratio may be the peak divided by the square root of the non-zero pixel count. For example, assuming that a particular touch profile is generally circular, if the peak for a finger or stylus area is used to represent the height of a cone, and the non-zero pixel count for the finger or stylus area is used to represent the area of the base of that cone, the peak divided by the square root of the non-zero pixel count may be directly proportional to the height of the cone divided by the diameter of the base of the cone.

Referring now to FIG. 2, the touch panel controller 104 may include a processing module 120, a communications module 122, and a memory module 124. The processing module 120 provides processing functionality for the touch panel controller 104 and may include any number of processors, micro-controllers, or other processing systems and resident or external memory for storing data and other information accessed or generated by the touch panel controller 104. The processing module 120 may execute one or more software programs which implement techniques described herein. The processing module 120 is not limited by the materials from which it is formed or the processing mechanisms employed therein, and as such, may be implemented via semiconductor(s) and/or transistors (e.g., using electronic Integrated Circuit (IC) components), and so forth. The communications module 122 is operatively configured to communicate with components of the touch panel 102. For example, the communications module 122 can be configured to control the drive electrodes of the touch panel 102, receive inputs from the sensor electrodes of the touch panel 120, and so forth. The communications module 122 is also communicatively coupled with the processing module 120 (e.g., for communicating inputs from the sensor electrodes of the touch panel 120 to the processing module 120).

The memory module 124 is an example of tangible computer-readable media that provides storage functionality to store various data associated with operation of the touch panel controller 104, such as software programs and/or code segments, or other data to instruct the processing module 120 and possibly other components of the touch panel controller 104 to perform the steps described herein. For example, memory module 124 may be used to store one or more rule sets configured to allow the processing module 120 to differentiate touch input from hover input, and so forth. Although a single memory module 124 is shown, a wide variety of types and combinations of memory may be employed. The memory module 124 may be integral with the processing module 120, may comprise stand-alone memory, or may be a combination of both. The memory module 124 may include, but is not necessarily limited to: removable and non-removable memory components, such as Random Access Memory (RAM), Read-Only Memory (ROM), Flash memory (e.g., a Secure Digital (SD) memory card, a mini-SD memory card, a micro-SD memory card), magnetic memory, optical memory, Universal Serial Bus (USB) memory devices, and so forth. In embodiments, the client device 104 memory 118 may include removable Integrated Circuit Card (ICC) memory, such as memory provided by a Subscriber Identity Module (SIM) card, a Universal Subscriber Identity Module (USIM) card, a Universal Integrated Circuit Card (UICC), and so on.

Example Process

Figure 3:
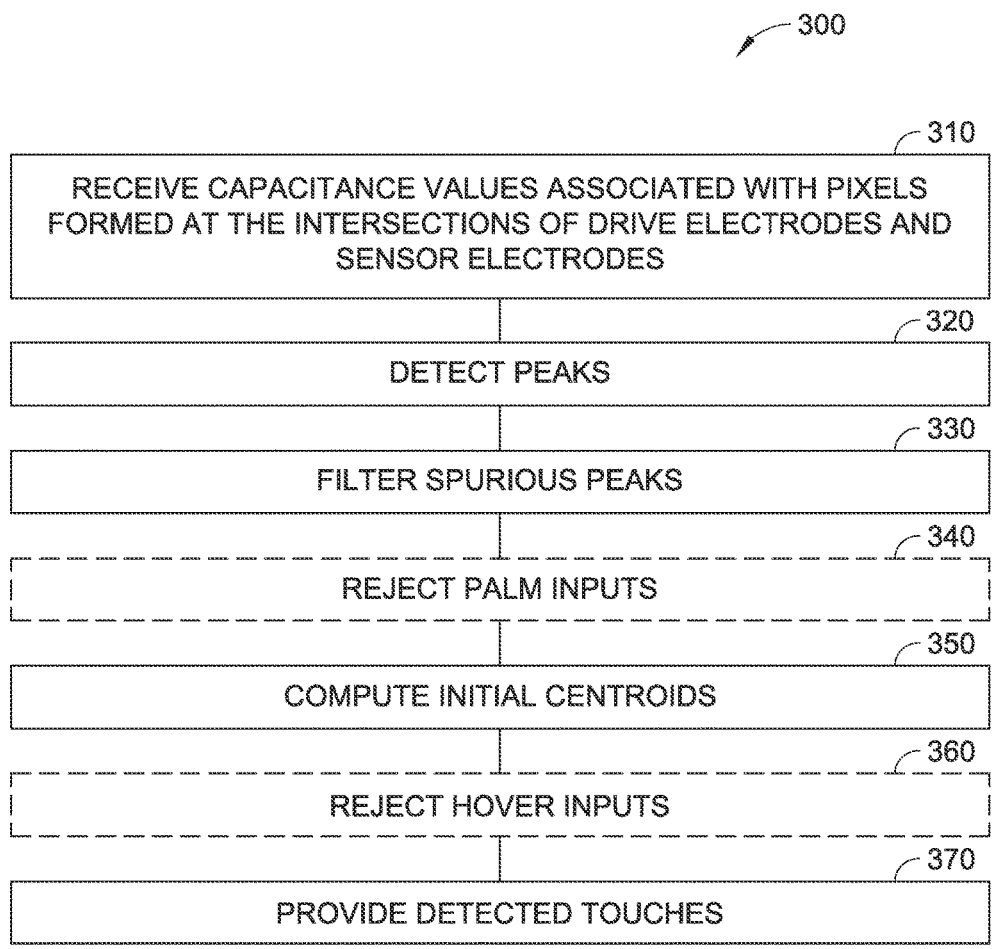
FIG. 3 is a flow diagram illustrating a method for identifying hover and/or palm input and rejecting spurious input to a touch panel in accordance with example implementations of the present disclosure.
Figure 4:
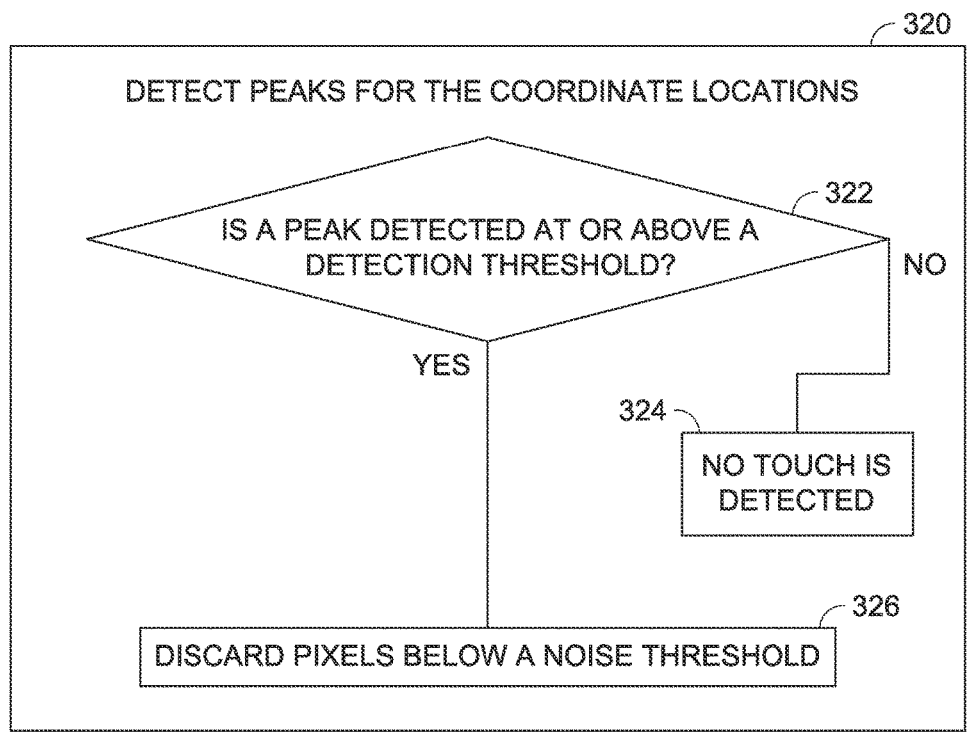
FIGS. 4 through 7 are flow diagrams further illustrating steps of the method illustrated in FIG. 3.
Figure 5:
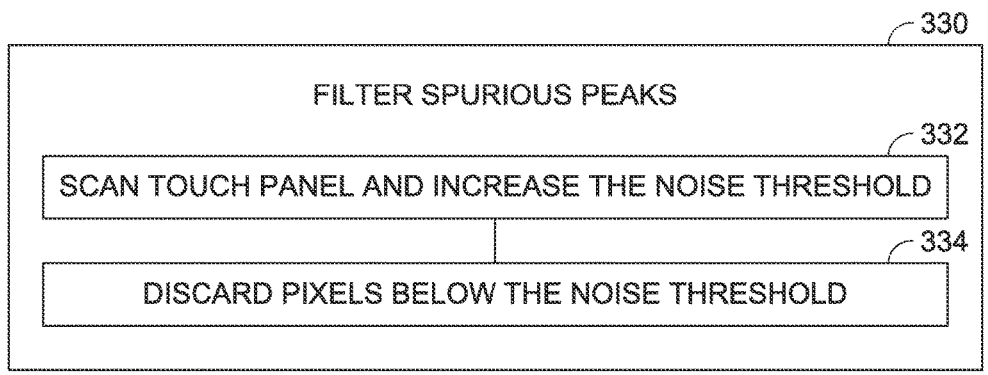
Figure 6:
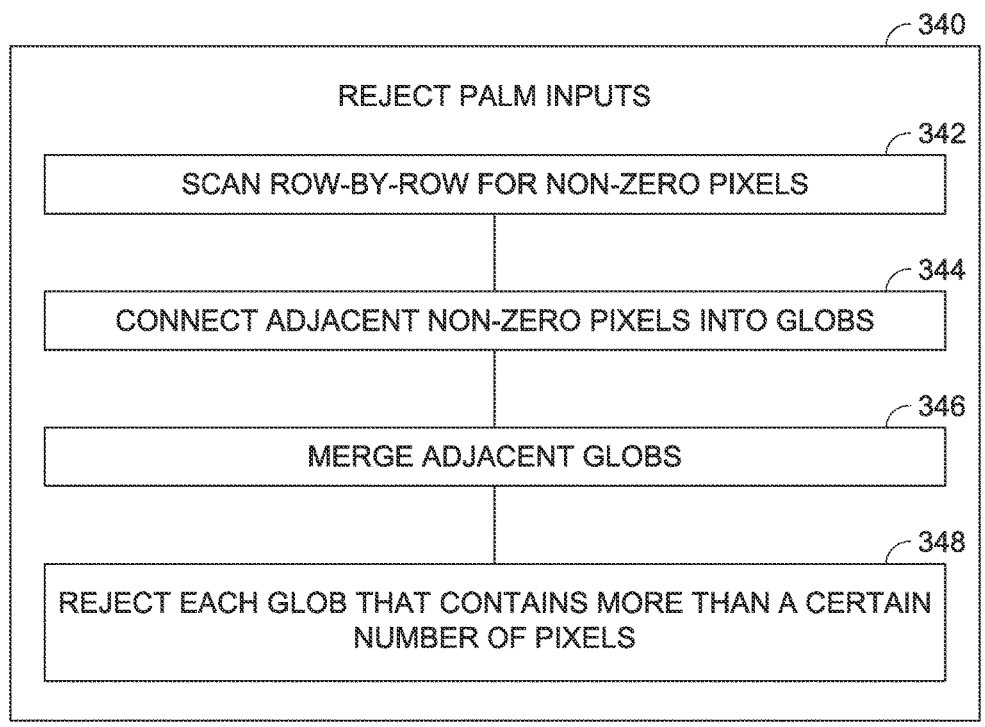
Figure 7:
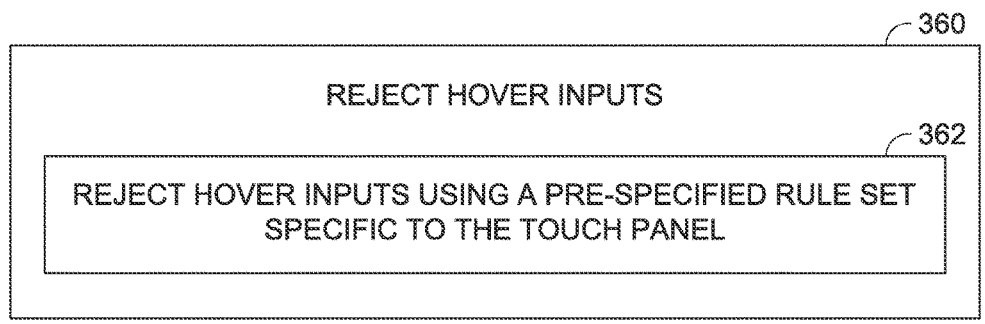

Referring now to FIG. 3, example techniques are described for identifying hover and/or palm input and rejecting spurious input to a touch panel.

FIG. 3 depicts a process 300, in an example implementation, for identifying hover and/or palm input and rejecting spurious input to a touch panel, such as touch panel 102 included with touch panel assembly 100 illustrated in FIGS. 1 and 2 and described above. In the process 300 illustrated, capacitance values associated with pixels formed at the intersections of drive electrodes and sensor electrodes are received (Block 310). For example, with reference to FIGS. 1 and 2, Z-values for various coordinate locations of touch panel 102 are received by touch panel controller 104. As described, the touch panel 102 can be calibrated so that each capacitance value associated with a pixel will register a Z-value at or near the upper range of possible pixel values for that location during a full touch condition.

Next, one or more peaks are detected (Block 320). In implementations, if no peak is detected at or above a detection threshold (Decision Block 322) process 300 may report the absence of a detected touch (Block 324). Otherwise process 300 proceeds to discard pixels below a noise threshold (Block 326). As described, global zero-thresholding may be performed based on panel noise, where negative Z-values are discarded after subtracting a noise threshold value and replaced with zero (0) values. Further, local thresholding may also be performed to discard Z-values based on thresholds that can vary for different regions of the touch panel 102 (e.g., for an outer panel portion 114 versus an inner panel portion 116). In some instances, local thresholding may vary based on finger peak level. For example, a low peak may imply a stylus, and the zero-thresholding may be equal to the noise threshold for the touch panel. In other instances, a strong peak may imply a finger, and the threshold for the zero-thresholding may be increased relative to the noise threshold. In a particular implementation, a single peak threshold having a threshold count of approximately eight hundred (800) can be used to differentiate a stylus touch from a finger touch. Then, dynamic zero-thresholding with a threshold count of approximately one hundred fifty (150) for a stylus and/or approximately two hundred fifty (250) for a finger may be used for centroid computation.

Then, one or more spurious peaks are filtered from the detected peaks (Block 330). For example, when fingers are coupled with row or column connection wires, spurious pixels (false touches) may be produced in the form of isolated peaks, or peaks that are not adjacent to any non-zero pixels. These isolated peaks may be filtered using a three-by-three (3×3) matrix spatial kernel such as [1,1,1; 1,−k,1; 1,1,1], where ";" indicates a new row in the matrix representation. The value of "k" in this example can be optimized to distinguish between a stylus and a spurious pixel. In some instances, the position of a touch can be correlated to a spurious peak registered elsewhere on the touch panel, and the value of "k" can be weighted based upon whether a touch (large peak) is located at a critical area of the panel identified in this manner. In implementations, the touch panel may be scanned and the noise threshold may be increased (Block 332). For example, the peak values can be sorted in descending order, and excess peaks at lower peak levels can be discarded by increasing the noise threshold. Then, pixels below the noise threshold may be discarded (Block 334).

In some instances, one or more palm inputs are rejected (Block 340). The term "palm rejection" may be used to refer to the detection of a touch that is irregular (e.g., generally non-circular) and/or too large (e.g., larger than the diameter of a typical finger). In implementations, a row-by-row scan may be performed for non-zero pixels (Block 342). For example, a raster scan may be used on the touch panel. Next, adjacent non-zero pixels may be connected into globs (Block 344). For instance, each thresholded non-zero pixel may be assigned a glob identification (ID). Based on the scan direction, non-zero pixels that are neighbors in certain directions are allocated to the same glob ID. In an example implementation, the scan may start with the second row, and may be performed for each pixel "x" as follows:

$$BAC$$

$$Dx$$

In this implementation, each pixel "A," "B," "C," and "D" adjacent to pixel "x" is checked for a non-zero value (e.g., in the alphabetical order indicated). If any one of these four pixels is a non-zero pixel, then pixel "x" is assigned the glob ID of that pixel.

Then, adjacent globs may be merged (Block 346). For example, globs that are found to touch are combined into a single glob. For the purposes of the present disclosure, the term "touching" may be used to refer to globs that are separated by less than a distance that would be present between finger touches (e.g., less than approximately ten and one-half millimeters (10.5 mm)). Next, each glob that contains more than a certain number of pixels may be rejected (Block 348). In some instances, when a glob size exceeds the palm rejection threshold (e.g., in terms of a number of pixels) and a palm is detected, the zeroing threshold can be lowered and the panel rescanned. The zeroing threshold may also be lowered when a large body is detected in terms of total panel non-zero pixel count and/or total panel mass. Lowering the zeroing threshold may improve the coalescence of adjacent globs that belong to the same palm, but may otherwise be separated due to a higher noise threshold. In this type of implementation, it may be implied that a stylus or finger is far enough from the palm that it will not coalesce with the palm despite a lowered threshold. Further, in some implementations, information indicating the presence of a large body determined using specific absorption rate (SAR) proximity detection (e.g., via self and/or mutual capacitance based sensing) may be used to lower the threshold for glob detection and enlarge globs so they are more prone to merger.

Then, an initial centroid computation is performed (Block 350). For instance, the touch panel controller 104 may be used to compute a centroid for each touch area detected. In some instances, one or more hover inputs are rejected (Block 360). In implementations, the aspect ratio for each touch area may be examined based upon pixel count (e.g., the number of non-zero pixels after thresholding), and a decision can be made regarding whether each detected input area represents a hover or a touch. For example, a hover condition may produce a lower aspect ratio when compared to the aspect ratio for a touch condition. The aspect ratio can be determined for a given thresholding value and may be specific to a particular touch panel configuration. There may be a strong correlation between aspect ratio and pixel count for hover and touch. Thus, the determination of aspect ratio for a touch area may provide more accurate results for touch and/or hover determination when compared to techniques that use mass and/or peak based decisions.

In implementations, hover inputs may be rejected using a pre-specified rule set specific to the touch panel (Block 362). For example, in a particular implementation, based upon robot scan analysis and mathematical modeling of panel mutual capacitance with a finger, it was found that a finger profile closely resembled a Gaussian profile that was slightly flattened at its top. Thus, another definition of the term "aspect ratio" may use a Gaussian approximation that is independent of actual centroid thresholding. In this case, the non-zero pixel count may be used for 1/e thresholding relative to peak for the aspect ratio computation. In some instances, aspect ratio testing for a particular touch panel based on non-zero pixel count can be modified based on finger or stylus location. Thus, a touch panel can be zoned into multiple (e.g., two (2), three (3), or more than three (3)) concentric segments over which hover rejection rules may be uniform. Then, based upon centroid position (which may be either raw or linearized for touch accuracy), a corresponding zone may be determined and a particular hover rejection rule may be applied.

Aspect ratio testing can be configured for a stylus so that peak and/or mass values are also considered. A stylus may produce a much lower peak than a finger touch. Thus, a hovering stylus may generate input close to the noise floor for a peak, and the mass of a stylus may also be much lower than the mass of a finger hover (the mass of a finger hover being less than the mass of a finger touch). Further, in some instances, a full two-dimensional (2-D) spatial correlation of a finger profile (which may be non-thresholded) can be performed with a predicted hover and a touch profile for the corresponding finger size (e.g., where finger size is equal to a number of pixels greater than 1/e of a peak). The predicted profiles may be parameterized models generated from robot scan mean profiles for touch and hover for various finger sizes. In this type of implementation, independent model parameters may include panel segment number, hover, and touch. Then, one or more detected touches are provided (Block 370). For example, the touch panel controller 104 may provide the centroids of the detected touches to a software application or the like.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A touch panel controller comprising:
   a communications module configured to receive a first plurality of pixel values, each pixel value of the first plurality of pixel values representing a capacitance associated with a respective pixel of a plurality of pixels formed at a respective intersection of a drive electrode and a sensor electrode of a touch panel; and
   a processing module communicatively coupled with the communications module and configured to:
   identify a peak pixel value from the first plurality of pixel values;
   detect an input based on the identified peak pixel value;
   discard pixel values of the first plurality of pixel values that are below a first threshold,
   discard pixel values of the first plurality of pixel values that are above the first threshold and that are not adjacent to at least one other pixel value above the first threshold,
   determine a number of pixel values remaining in the first plurality of pixel values after the discardings that are associated with the detected input;
   determine an aspect ratio for the detected input based on the identified peak pixel value and the determined number of pixel values, wherein determining the aspect ratio includes performing a 1/e thresholding operation relative to the identified peak pixel value;
   determine whether the detected input is associated with a touch input or a hover input based on the aspect ratio; and
   provide or reject the detected input based on the determination of whether the detected input is associated with a touch input or a hover input.

2. The touch panel controller as recited in claim 1, wherein the processing module is further configured to:
   associate at least one of the first plurality of pixel values with a finger touch;
   increase the first threshold; and
   discard pixel values of the first plurality of pixel values that are below the increased first threshold.

3. The touch panel controller as recited in claim 1, wherein the processing module is further configured to weight a filter for a first pixel value associated with a pixel at a first respective pixel location based upon identifying a touch at a second pixel location separated from and non-adjacent to the first pixel location.

4. The touch panel controller as recited in claim 1, wherein the processing module is further configured to use specific absorption rate (SAR) proximity detection to identify the presence of the palm in proximity to the touch panel.

5. A method comprising:
scanning a plurality of pixels of a touch panel, each pixel of the plurality of pixels being formed at a respective intersection of a drive electrode and a sensor electrode;
receiving a first plurality of pixel values based on the scanning, each pixel value of the first plurality of pixel values representing a capacitance associated with a respective pixel of the plurality of pixels;
discarding pixel values of the first plurality of pixel values that are below a first threshold;
discarding pixel values of the first plurality of pixel values that are above the first threshold and that are not adjacent to at least one other pixel value above the first threshold;
associating pixel values of the first plurality of pixel values that are above the first threshold and that are adjacent to at least one other pixel value above the first threshold with a glob;
determining whether the glob is associated with an irregular input; and
if the glob is associated with an irregular input:
decreasing the first threshold;
rescanning the plurality of pixels;
receiving a second plurality of pixel values based on the rescanning;
associating pixel values of the second plurality of pixel values that are above the decreased first threshold and that are adjacent to at least one other pixel value of the second plurality of pixel values above the decreased first threshold with the glob; and
rejecting the irregular input associated with the glob.

6. The method as recited in claim 5, further including:
associating at least one of the first plurality of pixel values with a finger touch;
increasing the first threshold; and
discarding pixel values of the first plurality of pixel values that are below the increased first threshold.

7. The method as recited in claim 5, wherein discarding pixel values above the first threshold that are not adjacent to at least one other pixel value above the first threshold comprises weighting a filter for a first pixel value associated with a pixel at a first respective pixel location based upon identifying a touch at a second pixel location separated from the first pixel location.

8. The method as recited in claim 5, further including merging the glob with an adjacent glob.

9. The method as recited in claim 5, further comprising: identifying the presence of a palm in proximity to the touch panel based on specific absorption rate (SAR) proximity detection.

10. A method comprising:
receiving a plurality of pixel values, each pixel value of the plurality of pixel values representing a capacitance associated with a respective pixel of a plurality of pixels formed at a respective intersection of a drive electrode and a sensor electrode of a touch panel;
identifying a peak pixel value from the plurality of pixel values;
detecting an input based on the identified peak pixel value;
discarding pixel values of the plurality of pixel values that are below a first threshold;
discarding pixel values of the plurality of pixel values that are above the first threshold and that are not adjacent to at least one other pixel value above the first threshold;
determining a number of pixel values remaining in the first plurality of pixel values after the discardings that are associated with the detected input;
determining an aspect ratio for the detected input based on the identified peak pixel value and the determined number of pixel values, wherein determining the aspect ratio includes performing a 1/e thresholding operation relative to the identified peak pixel value;
determining whether the detected input is associated with a touch input or a hover input based on the aspect ratio; and
providing or rejecting the detected input based on the determination of whether the detected input is associated with a touch input or a hover input.

11. The method as recited in claim 10, wherein discarding pixel values above the first threshold that are not adjacent to at least one other pixel value above the first threshold comprises weighting a filter for a first pixel value associated with a pixel at a first respective pixel location based upon identifying a touch at a second pixel location separated from the first pixel location.

12. The touch panel controller as recited in claim 1, wherein the processing unit is further configured to:
associate pixel values of the first plurality of pixel values that are above the first threshold and that are adjacent to at least one other pixel value above the first threshold with a glob;
determine whether the glob is associated with an irregular input; and
if the glob is associated with an irregular input:
decrease the first threshold;
rescan the plurality of pixels;
receive a second plurality of pixel values based on the rescan;
associate pixel values of the second plurality of pixel values that are above the decreased first threshold and that are adjacent to at least one other pixel value of the second plurality of pixel values above the decreased first threshold with the glob; and
reject the irregular input associated with the glob.

13. The touch panel controller as recited in claim 12, wherein to determine whether the glob is associated with an irregular input, the processing module is configured to:
determine a number of pixels associated with the glob; and
if the determined number of pixels associated with the glob is greater than a second threshold, determine that the glob is associated with an irregular input.

14. The touch panel controller as recited in claim 12, wherein to determine whether the glob is associated with an irregular input, the processing module is configured to:
perform specific absorption rate (SAR) proximity detection to determine whether an irregular object is in proximity to the touch panel.

15. The method of claim 5, wherein determining whether the glob is associated with an irregular input includes:
determining a number of pixels associated with the glob; and
if the determined number of pixels associated with the glob is greater than a second threshold, determining that the glob is associated with an irregular input.

16. The method of claim 5, wherein determining whether the glob is associated with an irregular input includes performing specific absorption rate (SAR) proximity detection to determine whether an irregular object is in proximity to the touch panel.

17. The method as recited in claim 10, further including determining a centroid for the detected input, wherein the determining of whether the detected input is associated with a touch input or a hover input is further based on a position of the centroid on the touch panel.

18. The touch panel controller as recited in claim 12, wherein the processing module is further configured to merge the glob with an adjacent glob.

\* \* \* \* \*